July 18, 1933.  E. J. SEIDENBERG  1,918,292

MOUNTING FOR AUTOCOLLIMATORS

Filed May 18, 1931

Inventor
Edwin J. Seidenberg
By Barrett & Truman
Attorneys

Patented July 18, 1933

1,918,292

UNITED STATES PATENT OFFICE

EDWIN J. SEIDENBERG, OF TOLEDO, OHIO, ASSIGNOR TO LIBBEY CATAPHOTE CORPORATION, OF TOLEDO, OHIO, A CORPORATION OF OHIO

MOUNTING FOR AUTOCOLLIMATORS

Application filed May 18, 1931. Serial No. 538,366.

This invention relates to new and useful improvements in mountings for autocollimators. Glass buttons so shaped and partially silvered so as to reflect light beams back to their source are now being manufactured and mounted in various manners to form signs, containing advertising matter, warnings, directional information and the like, which become visible at night as the beams of automobile head lights strike them. There are many different devices for mounting such autocollimating lenses and my invention is directed to an improvement over these devices. These autocollimators should be encased in mountings which allow only the objective lenses to be visible, thus affording the greatest protection to the glass buttons, at the same time not affecting their efficiency. They should also be encased or mounted so as to allow easy and rapid mounting on a panel to form the letters or numbers of the completed sign.

The main objects of my invention are to provide a mounting for such autocollimating lens which is simple and inexpensive to manufacture, securely holds the lens in correct position, affords utmost protection and is neatly and easily mountable on the panel comprising the sign.

Further objects of my invention will appear from the detailed description of the embodiment shown in the accompanying drawing.

1 indicates the autocollimator or button to be mounted, having objective lens 2 and silvered reflecting lens 3 connected together by a tapered portion 3ª.

Figure 5:
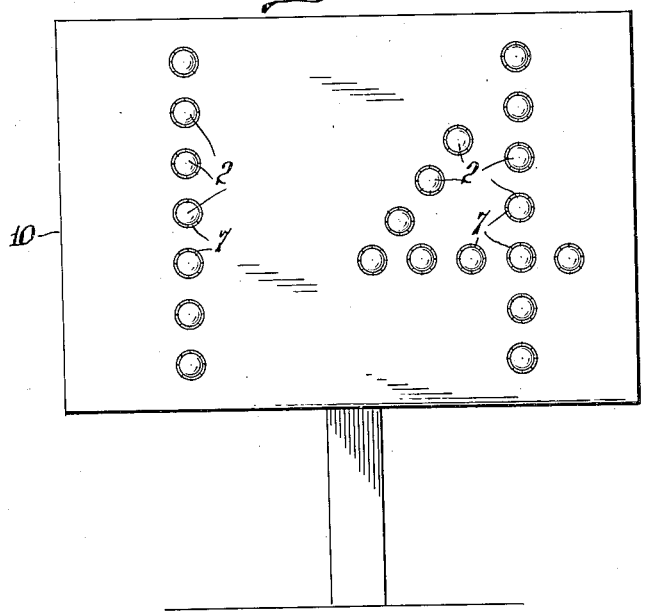
Fig. 5 is a front elevation of a sign composed of a plurality of such mountings.
Figure 6:
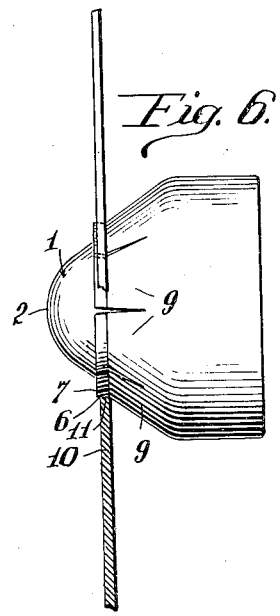
Fig. 6 is an enlarged side elevation of one of the units shown in Fig. 5.
Figure 3:
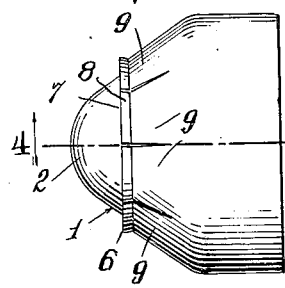
Fig. 3 is a side elevation of an autocollimator mounted in the shell.
Figure 4:
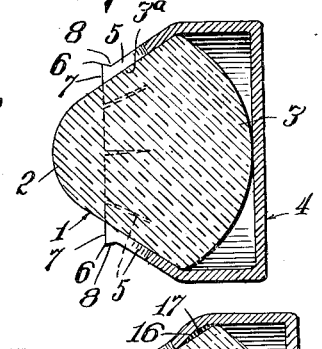
Fig. 4 is a cross section taken along line 4—4 of Fig. 3.

The mounting consists of a cylindrical cup 4, out of the sides of which are cut V-shaped segments 5 at regular intervals. The outside edge of the mouth of the cup is thickened or crimped outwardly to form a wedge shaped projection 6 having two faces 7 and 8 approximately at right angles to one another. The cutting out of the V-shaped segments 5 from the side of the cut 4 forms a plurality of tabs 9. The cup 4 has a diameter slightly larger than the diameter of the thickest part of the button between its objective lens 2 and its reflective surface 3, thus allowing the button to snugly fit into the cup with its objective lens 2 extending from the mouth. When the button is so positioned, the tabs 9 are bent over until flush with the tapered portion 3ª of the button, as shown in Figs. 3 and 4. The button is thus securely held in proper position. The faces 8 of the projections 6 in this bended position are drawn together so as to present an annular seat in approximately parallel plane with the axis of the button. Numeral 10 indicates a portion of a panel for receiving such a mounted autocollimator having a circular opening 11 of diameter slightly smaller than that of the annular seat formed by faces 8, so as to form a driving fit between the mounted button and the panel, as shown clearly in Fig. 6.

If a driving fit is not desired, the diameter the opening 11 may be made slightly larger than that of the annular seat and some of the tabs 9 may be sprung outwardly slightly so as to provide a spring fit between the panel and the mounting. The other tabs 9 will be sufficient to hold the autocollimator securely in position.

Figure 7:
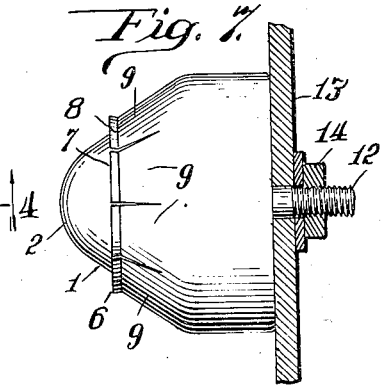
Fig. 7 is a side elevation of an alternative embodiment of my invention.

Fig. 7 illustrates another means for mounting the unit on a panel. Instead of providing a frictional fit between the ends 6 of the tabs 9 and the edge of the opening 11, a threaded bolt 12 is secured to the bottom of the cup 4 and is adapted to extend through a hole in a panel 13 and receive a nut 14 which is tightened to securely hold the unit in position.

Figure 2:
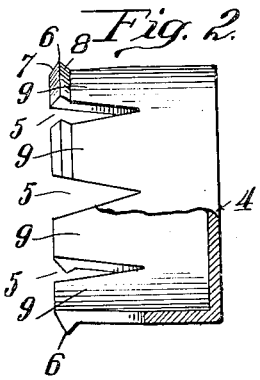
Fig. 2 is a side elevation of the shell which forms the mounting, the shell being partially broken away.
Figure 1:
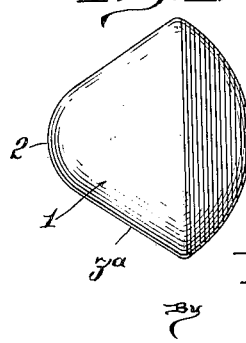
Fig. 1 is a side elevation of the type of autocollimator I refer to herein.
Figure 8:
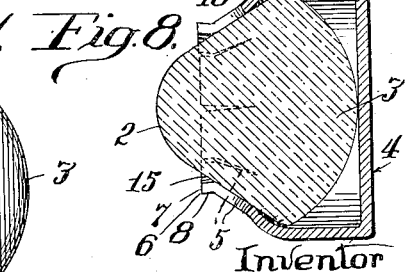
Fig. 8 is a sectional side elevation of another form of my invention.

Fig. 8 illustrates a button mounted in a cup 4 in which the outside edge of the mouth has been crimped outwardly as at 15 to form the projection 6 and the faces 7 and 8 instead of being thickened as in Figs. 2 and 4. Also Fig. 8 discloses a mounting of this type provided with an annular recess 16 in which is positioned any desired water-proofing substance 17 to act as a gasket to prevent water from leaking into the mounting behind the button.

I claim:

1. A mounting for an autocollimator comprising a cup shaped member adapted to receive an autocollimator, a plurality of tabs formed from the side of said member and adapted to be bent upon the sides of said autocollimator, outwardly extending V-shaped projections formed on the ends of said tabs, a panel, an opening in said panel adapted to engage frictionally one face of said V-shaped projections, the objective lens of said autocollimator extending through said opening.

2. A mounting for an autocollimator comprising a cup shaped member adapted to receive an autocollimator the objective lens thereof extending from said member and the reflecting lens abutting the bottom of said member, a plurality of tabs formed from the side of said member adapted to be bent upon the sides of said autocollimator, outwardly extending projections formed on the ends of said tabs, a panel, an opening in said panel, said projections being adapted to be forced within said opening and held frictionally thereby.

3. In combination a one-piece autocollimator comprising an objective lens and a reflecting lens, a cup shaped member partially encasing said autocollimator and exposing its objective lens through its open end, tabs formed from the side of said cup shaped member and bent upon the sides of said autocollimator adjacent the objective lens, the extreme outer ends of said tabs forming an annular seat in approximately parallel plane to the axis of the autocollimator, a panel, an opening in said panel, said objective lens extending through said opening, said annular seat in driving fit with said opening.

4. In combination a one-piece autocollimator comprising an objective lens and a reflecting lens, a cup shaped member encasing said reflecting lens and exposing said objective lens, a plurality of tabs formed from the side of said cup shaped member and bent over upon the sides of said autocollimator terminating adjacent said objective lens, outwardly extending projections formed on the ends of said tabs to form an annular seat in approximately parallel plane with the axis of the autocollimator, a panel, a circular opening in said panel, said objective lens extending through said opening and visible from the front of said panel, said seat fitting securely within said opening in driving fit and being substantially flush with the front of said panel.

5. In combination a one-piece autocollimator comprising an objective lens, a larger reflecting lens, a tapered portion connecting said lenses, a cup shaped member encasing said reflecting lens and exposing said objective lens, a plurality of tabs formed by cutting V-shaped segments from the wall of said cup shaped member and bent over upon the tapered portion of said autocollimator terminating adjacent said objective lens, outwardly extending projections formed on the ends of said tabs drawn together by the bending of said tabs to form a continuous annular seat, a panel, a circular opening in said panel, said objective lens extending through said opening and visible from the front of the panel, said annular seat fitting securely within said opening and being substantially flush with the front of said panel.

6. A mounting for an autocollimator having a small objective lens and a larger reflecting lens, comprising a cup shaped member adapted to receive the autocollimator and expose the objective lens, a plurality of tabs formed from the side of said cup shaped member by cutting V-shaped segments therefrom and adapted to be bent over upon the sides of the autocollimator, and means formed on said tabs for mounting said member on a panel.

7. A mounting for an autocollimator having a small objective lens and a larger reflecting lens, comprising a cup shaped member adapted to receive the autocollimator and expose the objective lens, a plurality of tabs formed from the side of said cup shaped member by cutting V-shaped segments therefrom and adapted to be bent over upon the sides of the autocollimator and thus drawn together so that the objective lens is the only part of the autocollimator visible, and projections formed on the ends of said tabs to present an annular seat when the autocollimator is encased, a panel, a circular opening in said panel, said annular seat adapted to fit within and frictionally engage the edges of said opening.

8. A mounting for a one-piece autocollimator having a small objective lens, a larger reflective lens, a tapered portion joining said lenses, comprising a cup shaped member with a cylindrical wall and flat bottom adapted to partially encase the autocollimator exposing the objective lens through its open end, a plurality of tabs having upwardly converging sides formed from the said cylindrical wall by cutting V-shaped segments therefrom and adapted to be bent upon the tapered portion of the autocollimator and thus drawn together so as to completely encase all of the autocollimators excepting the objective lens, outwardly extending wedge shaped projections formed on the ends of said tabs adapted to form a complete annular seat adjacent the objective lens when said tabs are in bent position, a panel, a circular opening in said panel adapted to receive said annular seat in frictional engagement and expose the objective lens.

EDWIN J. SEIDENBERG.